United States Patent
Chen et al.

(10) Patent No.: US 7,620,217 B2
(45) Date of Patent: Nov. 17, 2009

(54) THREE-DIMENSIONAL FACE RECOGNITION SYSTEM AND METHOD

(75) Inventors: Wen-Chao Chen, Hsinchu Hsien (TW); Tzung-Han Lin, Hsinchu Hsien (TW); Hong-Long Chou, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 743 days.

(21) Appl. No.: 11/450,581

(22) Filed: Jun. 12, 2006

(65) Prior Publication Data
US 2007/0152037 A1 Jul. 5, 2007

(30) Foreign Application Priority Data
Dec. 29, 2005 (TW) .............................. 94147174 A

(51) Int. Cl.
*G06K 9/00* (2006.01)

(52) U.S. Cl. ...................................... 382/118; 382/154

(58) Field of Classification Search ................. 382/118, 382/154, 209, 218, 203; 345/418–419
See application file for complete search history.

(56) References Cited

U.S. PATENT DOCUMENTS

| | | | |
|---|---|---|---|
| 6,381,346 B1* | 4/2002 | Eraslan | 382/118 |
| 2004/0175039 A1* | 9/2004 | Miller | 382/181 |
| 2006/0285755 A1* | 12/2006 | Hager et al. | 382/224 |
| 2007/0091085 A1* | 4/2007 | Wang et al. | 345/420 |

OTHER PUBLICATIONS

Park, et al. "3D Model Assisted Face Recognition in Video", IEEE, pp. 1-8, 2005.*

* cited by examiner

*Primary Examiner*—Daniel G Mariam
(74) *Attorney, Agent, or Firm*—Birch, Stewart, Kolasch & Birch, LLP

(57) ABSTRACT

A 3-D face recognition system has a first data storing module for storing 3-D face model data and 2-D face image data; an input unit for inputting 3-D face model data and 2-D face image data; a signal converting module for converting analog data of the 3-D face model data and 2-D face image data to digital data; a second data storing module for storing the digital data; a microprocessing module for analyzing geometric characteristics of points in the 3-D face model data stored in the first and second data storing module to determine feature points of the 3-D face model data, and assigning different weight ratios to feature points; and a comparing module for comparing the feature points stored in the first and second data storing module, during which, different geometric characteristics being given different weight ratios, and calculating relativity between the feature points to obtain a comparison result.

23 Claims, 4 Drawing Sheets

| Parts | A | B | C | D | E | F | G | H | I | J | K | L | M | N | O | P | Q | R | S | T | | | Threshold | Recognition Rate |
|---|---|---|---|---|---|---|---|---|---|---|---|---|---|---|---|---|---|---|---|---|---|---|---|---|
| A | 0.2953 | 2.0319 | 0.7171 | 1.2009 | 1.7156 | 1.6711 | 1.5825 | 0.7981 | 0.8479 | 1.0758 | 0.8911 | 1.8971 | 1.9656 | 0.8342 | 0.9982 | 0.7615 | 1.28 | 1.1056 | 1.3048 | 1.6659 | | A | 0.495 | 100% |
| B | 1.8515 | 0.1933 | 2.6534 | 1.8363 | 1.9657 | 1.9469 | 1.8841 | 2.1797 | 2.708 | 2.0468 | 2.7224 | 1.6474 | 3.0816 | 1.5384 | 2.6873 | 2.4134 | 2.7738 | 1.2183 | 2.3848 | 2.5808 | | B | 0.5 | 99.75% |
| C | 0.8034 | 2.7441 | 1.047 | 1.6158 | 2.0844 | 1.362 | 2.0063 | 1.6842 | 0.7995 | 1.2579 | 0.2205 | 2.4431 | 1.9308 | 1.2497 | 1.2636 | 0.9687 | 0.6948 | 1.3445 | 1.7451 | 1.9051 | | C | 0.55 | 99.50% |
| D | 1.0134 | 2.0152 | 1.5683 | 0.3416 | 0.7057 | 2.0042 | 1.1312 | 1.5408 | 1.4548 | 0.6692 | 0.9487 | 1.1496 | 1.8733 | 1.0139 | 1.0566 | 0.9286 | 1.7445 | 1.0129 | 1.0486 | 2.3618 | | D | 0.63 | 98.75% |
| E | 1.5981 | 1.9368 | 1.6005 | 1.1157 | 0.2304 | 2.3179 | 0.4955 | 1.7983 | 1.2225 | 0.8137 | 1.5309 | 0.8067 | 1.3946 | 0.9753 | 0.9917 | 1.4602 | 2.0094 | 0.8742 | 0.8671 | 2.365 | | E | 0.7 | 96% |
| F | 1.9027 | 3.0536 | 1.8001 | 2.3207 | 2.6712 | 0.274 | 2.56 | 2.0337 | 2.2236 | 2.3367 | 1.9197 | 3.2669 | 2.9398 | 2.2787 | 1.8563 | 1.7049 | 2.2677 | 1.0036 | 1.9027 | 1.1069 | | F | 0.8 | 94.25% |
| G | 1.7445 | 2.3094 | 1.9269 | 1.1442 | 0.512 | 2.5194 | 0.3259 | 2.1842 | 2.2975 | 0.6382 | 1.4235 | 0.8277 | 1.4792 | 1.1075 | 1.4865 | 1.4524 | 1.9942 | 1.3112 | 1.7445 | 2.9247 | | G | 0.9 | 89.50% |
| H | 0.7376 | 2.2951 | 0.9645 | 1.5688 | 2.2074 | 2.0001 | 2.4562 | 0.3348 | 1.9769 | 1.3172 | 1.3253 | 2.4877 | 2.1465 | 1.713 | 1.5452 | 1.0755 | 1.3222 | 1.4525 | 1.8251 | 1.3497 | | H | 1 | 84.25% |
| I | 1.345 | 3.517 | 0.9298 | 1.746 | 2.2249 | 1.9822 | 1.6432 | 1.7879 | 0.2097 | 1.3571 | 1.4655 | 2.5403 | 1.8805 | 1.53 | 1.5475 | 1.3103 | 1.1274 | 1.9354 | 2.4108 | 2.1166 | | I | | |
| J | 1.6961 | 2.0367 | 2.1178 | 1.1807 | 0.7553 | 2.2663 | 0.9888 | 1.7696 | 1.2485 | 0.1836 | 1.1771 | 1.6984 | 1.6345 | 0.8571 | 1.4673 | 1.6758 | 1.6039 | 0.9159 | 1.1211 | 2.5417 | | J | | |
| K | 0.9531 | 3.0784 | 1.047 | 1.2461 | 1.9248 | 1.4485 | 1.6765 | 1.5009 | 0.9552 | 1.1939 | 0.3983 | 2.071 | 1.8081 | 1.3457 | 0.7718 | 0.8441 | 1.6118 | 0.9671 | 1.6774 | 1.7338 | | K | | |
| L | 2.4808 | 2.5775 | 2.4348 | 1.4116 | 1.1191 | 3.2425 | 0.8246 | 3.0007 | 1.9376 | 1.4912 | 2.1727 | 0.1673 | 1.4591 | 1.9482 | 1.9235 | 2.2063 | 3.1211 | 1.9364 | 1.5067 | 4.004 | | L | | |
| M | 2.2094 | 3.6944 | 1.7161 | 2.2787 | 1.6843 | 2.7869 | 1.7106 | 2.2155 | 1.5109 | 1.8129 | 1.6748 | 1.3854 | 0.2653 | 1.785 | 2.1219 | 1.9722 | 2.1697 | 2.231 | 1.2482 | 3.3462 | | M | | |
| N | 0.9391 | 1.9569 | 1.3929 | 1.4011 | 1.3266 | 2.6181 | 1.5185 | 1.181 | 1.2728 | 0.785 | 1.0323 | 1.8675 | 1.8703 | 0.1693 | 1.5488 | 0.7444 | 1.7057 | 0.5733 | 1.109 | 1.8969 | | N | | |
| O | 0.8833 | 2.6261 | 0.9039 | 1.049 | 1.139 | 1.4971 | 1.1865 | 1.4028 | 0.9165 | 1.1186 | 0.7934 | 1.748 | 1.7778 | 1.2111 | 0.1465 | 1.0553 | 1.5095 | 1.2361 | 1.1622 | 2.0967 | | O | | |
| P | 0.7365 | 2.5161 | 0.582 | 1.1845 | 1.5567 | 1.5717 | 1.8933 | 1.0825 | 1.1462 | 0.9993 | 0.9786 | 2.3333 | 1.7499 | 0.8385 | 0.8361 | 0.3339 | 1.4056 | 0.8074 | 1.3348 | 1.5138 | | P | | |
| Q | 1.1945 | 3.0186 | 0.5914 | 1.354 | 2.2111 | 1.7509 | 2.0084 | 1.9009 | 1.1515 | 1.5114 | 1.471 | 2.8333 | 2.193 | 1.8192 | 1.4541 | 1.4075 | 0.2394 | 2.1737 | 2.2431 | 1.3274 | | Q | | |
| R | 1.2377 | 1.2754 | 1.4205 | 1.3248 | 1.1749 | 1.8992 | 1.7096 | 1.4852 | 1.4066 | 0.683 | 0.9037 | 1.8646 | 1.7375 | 1.0297 | 1.4024 | 0.8303 | 2.0481 | 0.1802 | 1.2442 | 1.872 | | R | | |
| S | 1.1081 | 2.385 | 1.0405 | 1.044 | 0.7662 | 1.6012 | 1.0661 | 1.6928 | 1.3914 | 1.0208 | 1.2376 | 1.1878 | 1.0333 | 0.7549 | 0.9628 | 0.7672 | 1.8162 | 0.925 | 0.2129 | 1.7782 | | S | | |
| T | 2.0829 | 2.4281 | 1.7164 | 2.7391 | 3.3195 | 0.8904 | 3.1813 | 1.7107 | 2.2707 | 2.1409 | 2.1319 | 3.6707 | 2.8753 | 1.9769 | 2.422 | 1.7687 | 1.21 | 1.81 | 2.4746 | 0.4307 | | T | | |

FIG. 4

THREE-DIMENSIONAL FACE RECOGNITION SYSTEM AND METHOD

FIELD OF THE INVENTION

The present invention relates to three-dimensional face recognition technology, and more particularly, to a three-dimensional face recognition system that is able to accurately select feature points of the face of a man.

BACKGROUND OF THE INVENTION

People live in an organized society. In today's world where technology advances rapidly and the structure of human society becomes more complicated, the organization of the society becomes more conscientious. People with different identities are given specific rights to conduct corresponding duties. For example, people with different identities are given rights to access different places, such as one is not allowed to trespass other people's houses or administrators in a company are not allowed to enter the research center thereof.

In view of the above, various entrance security systems are developed, including recognition systems and security systems. Recognition systems are for example swipe card, password or biological features recognition systems or the like. Biological features identification systems typically include face recognition, pupil recognition, fingerprint recognition, or voiceprint recognition for recognizing people.

Generally, in the field of biological recognition, face recognition is the one most commonly used among all. However, the majority of current face recognition methods employ two-dimensional images for face recognition. Three-dimensional (3-D) face recognition is still under development. In current face recognition method, the approach is to select facial features as 3-D feature points and compare them with 3-D face models in a database. However, information on a human face varies greatly, often very different 3-D feature attributes are found at two neighboring locations. Thus, the accuracy of selecting facial feature points significantly affects the recognition result. Poorly selected feature points may result in exceedingly large errors between the 3-D information of the selected feature points and the accurate points.

Therefore, how to accurately select feature points for recognition to reduce errors in recognition is a problem urgently waiting to be solved.

SUMMARY OF THE INVENTION

In the light of forgoing drawbacks, an objective of the present invention is to provide a 3-D face recognition system and method to accurately and quickly select feature points in a face image.

Another objective of the present invention is to provide a 3-D face recognition system and method that improves recognition rate.

In accordance with the above and other objectives, the present invention provides a three-dimensional (3-D) face recognition system, comprising: a first data storing module for storing a plurality of 3-D face model data and two-dimensional (2-D) face image data; an input unit for inputting a 3-D face model data and 2-D face image data; a signal converting module for converting the 3-D face model data and 2-D face image data inputted by the input unit from analog to digital format; a second data storing module for storing the digital 3-D face model data and 2-D face image data converted by the signal converting module; a microprocessing module for analyzing geometric characteristics of various points in the 3-D face model data stored in the first data storing module and the second data storing module so as to determine feature points of the 3-D face model data and store them in the respective first and second data storing module, wherein the 2-D facial image data is used to assist in confirming the various feature points of the 3-D face model data in order to select the most outstanding feature points in each region, and different weight ratios being given to different feature points; and a comparing module for comparing the 3-D face feature points stored in the first data storing module and the second data storing module analyzed by the microprocessing module, during which, different geometric characteristics being given different weight ratios, and calculating relativity between the two sets of 3-D face feature points to obtain a comparison result.

The geometric characteristics may be a relative location of a point in the 3-D region, the curvature, changes in the curvature and the normal vector of the point.

The feature points are selected such that they are not easily changed by human facial expression and are at proximity of bones. For example, the most protruding point of the nose tip, the most concaving portion of the inner eye corners or the outer eye corners or mouth corners. As an example, the region of an inner eye corner is analyzed by calculating the curvature of each point in that region, and the range of the principal curvature $\kappa_1$ is worked out to be between $-0.03 < \kappa_1 < -0.01$ within the region and the variance $\sigma$ of the principal curvature $\kappa_1$ is smaller than 0.02. Then, this point is selected to be a relatively outstanding feature point in this region.

The geometric characteristics compared by the comparing module are at least one of a relative location of a point in the 3-D region, the curvature, changes in the curvature and the normal vector of the point. Different weight ratios are assigned to different geometric characteristics and the relativity between the data in the first and second data storing module according to these geometric characteristics.

The present invention further provides a 3-D face recognition method, comprising: establishing a first data storing module for storing a plurality of 3-D face model data and 2-D face image data; inputting a 3-D face model data and 2-D face image data by an input unit; converting the 3-D face model data and 2-D face image data inputted by the input unit from analog to digital format by a signal converting module; storing the digital 3-D face model data and 2-D face image data converted by the signal converting module in a second data storing module; analyzing geometric characteristics of various points in the 3-D face model data stored in the first data storing module and the second data storing module by a microprocessing module, so as to determine feature points of the 3-D face model data and store them in the respective first and second data storing module, wherein the 2-D facial image data is used to assist in confirming the various feature points of the 3-D face model data in order to select the most outstanding feature points in each region, and different weight ratios being given to different feature points; and comparing the 3-D face feature points stored in the first data storing module and the second data storing module analyzed by the microprocessing module by a comparing module, during which, different geometric characteristics being given different weight ratios, and calculating relativity between the two sets of 3-D face feature points to obtain a comparison result.

Therefore, the 3-D face recognition system and method analyzes different geometric characteristics on 3-D face models, selects the substantially outstanding feature points and assigns different weight ratios thereto, such that they are basis for comparison. During comparison, different weight ratios are further assigned to different geometric characteristics of 3-D face models inputted by the input module and relativity between the two sets of data are calculated, enhancing the speed and accuracy of recognition.

BRIEF DESCRIPTION OF THE DRAWINGS

The present invention can be more fully understood by reading the following detailed description of the preferred embodiments, with reference made to the accompanying drawings, wherein:

FIG. 4 shows the experimental data for the 3-D face recognition system of the present invention.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
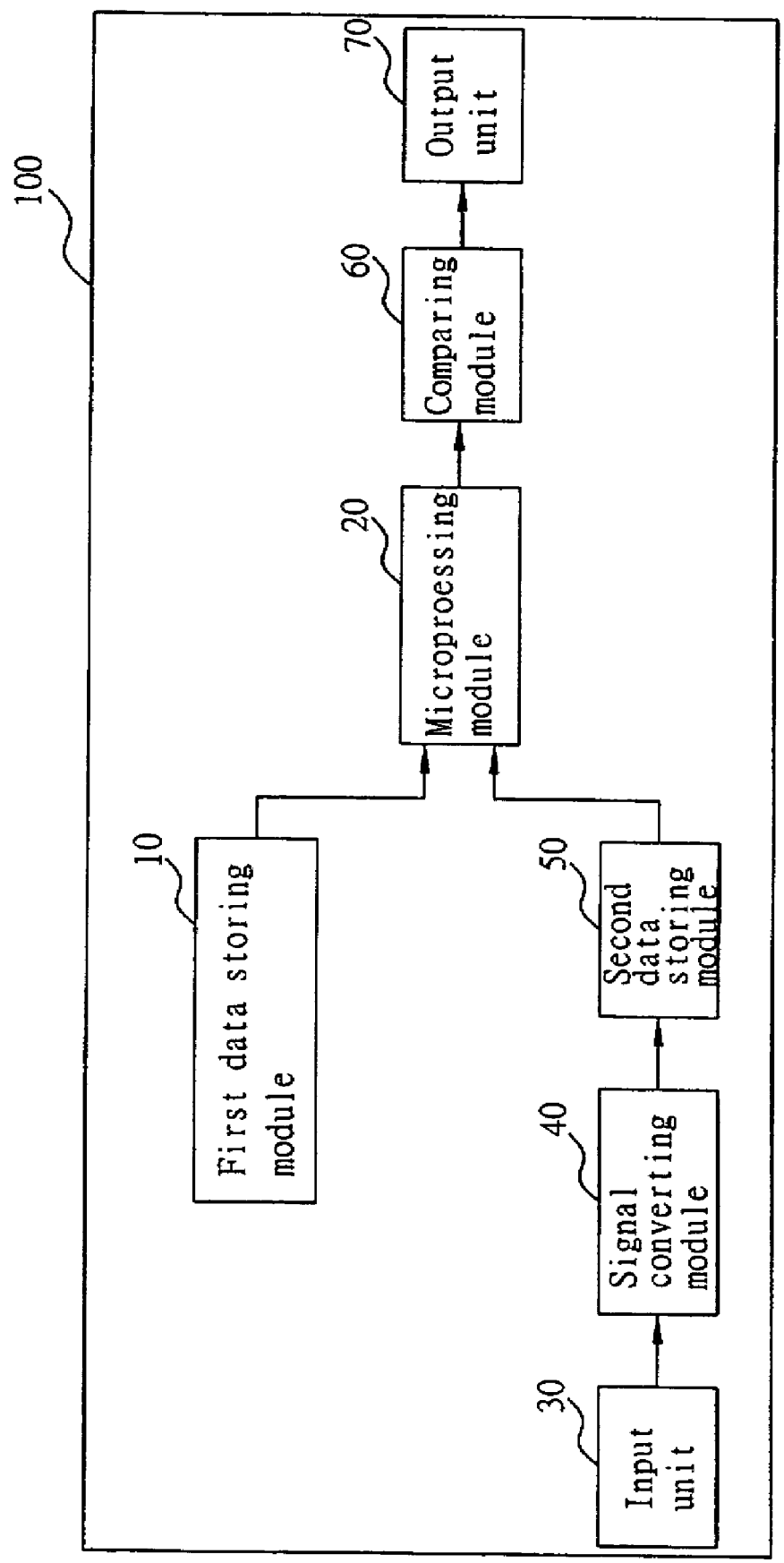
FIG. 1 shows a structural block diagram for 3-D face recognition system of the present invention.

FIG. 1 shows a functional block diagram for a 3-D face recognition system 100 of the present invention. The 3-D face recognition system 100 of the present invention is applicable to an intelligent information platform, such as a desktop computer, a notebook, or a Personal Digital Assistant (PDA) for providing functionalities for 3-D face recognition. The 3-D face recognition system 100 of the present invention comprises a first data storing module 10, a microprocessing module 20, an input unit 30, a signal converting module 40, a second data storing module 50, a comparing module 60 and an output unit 70.

The first data storing module 10 is used to store a plurality of 3-D face model data and 2-D facial image data for analysis by the microprocessing module 20.

The input unit 30 is used to input 3-D face model data and 2-D facial image data. In this embodiment, the input unit 30 is a scanner.

The signal converting module 40 is used to convert analog data of the inputted 3-D face model data and 2-D facial image data into digital data.

The second data storing module 50 is used to store the digital data of the 3-D face model data and 2-D facial image data after converted by the signal converting module 40.

The microprocessing module 20 is used to analyze the geometric characteristics of various points in a point group in each region of the 3-D face model data stored in the first data storing module 10 and the second data storing module 50. Thereby, the various feature points of the 3-D face model data can be determined. In addition, the 2-D facial image data can be used to assist in confirming the various feature points of the 3-D face model data in order to select the most outstanding feature points in each region. Different feature points are given different weight ratios. A symmetric face is defined and given different weight ratios.

In this embodiment, the geometric characteristics are relative location, curvature, changes in curvature and normal vector of each point in the 3-D region.

Feature points that tend not to be affect by facial expression are selected, which are normally near the bones of the human faces, for example, the most protruding point of the nose tip, the most concaving portion of the inner eye corners or the outer eye corners or mouth corners. As an example, the region of an inner eye corner is analyzed by calculating the curvature of each point in that region, and the range of the principal curvature $\kappa_1$ is worked out to be between $-0.03<\kappa_1<-0.01$ within the region and the variance $\sigma$ of the principal curvature $\kappa_1$ is smaller than 0.02. This point is selected to be the relatively outstanding feature point in this region.

After the relatively outstanding feature points in each region are selected, different weight ratios are given to each feature points. For example, the nose tip is a protruding characteristic that is not easily affected by facial expression, so the highest weight ratio is assigned thereto. Furthermore, the inner eye corner is the most concaving feature in a 3-D face model and is not easily affected by facial expression, so the second highest weigh ratio is assigned thereto. The outer eye corner is also not easily affected by facial expression and has a concaving characteristic in the 3-D face model, thus the third highest weight ratio is assigned. Finally, the mouth corners also have concaving characteristics, thus they are selected as feature points. However, the mouth corners tend to be affected more by facial expression. Each feature point is assigned with a different weight ratio, so that when they are being compared, the speed and accuracy of recognition can be improved by virtue of different weight ratios for different feature points.

The comparing module 60 compares the 3-D face feature points stored in the first data storing module 10 and the second data storing module 50 analyzed by the microprocessing module 20. During which, different geometric characteristics are given different weight ratios. As a result, the relativity between the feature points in the two modules is determined.

The geometric characteristics are for example the relative location, curvature, changes in curvature and normal vector of each point in the 3-D region, for which different weight ratios are assigned. The relativity between data in the first data storing module 10 and the second data storing module 50 are calculated based on the different weight ratios of different geometric characteristics. Thereby, the accuracy and speed of recognition can be enhanced.

During comparison, the comparing module 60 assigns different weigh ratios based on the defined symmetric face. For example, the comparison points closer to the symmetric face are less likely to be affected by facial expression, thus higher weigh ratios are assigned. Whereas, comparison points further from the symmetric face are more likely to be affected by facial expression, so that lower weight ratios are assigned. This allows the accuracy of recognition to be further improved.

The output unit 70 is used to output the result of comparison by the comparison module 60. This completes the recognition of 3-D face recognition system 100 of the present invention.

The 3-D face recognition method of the present invention comprises a registration process and a verification process, which are described in more details as follow.

Figure 2:
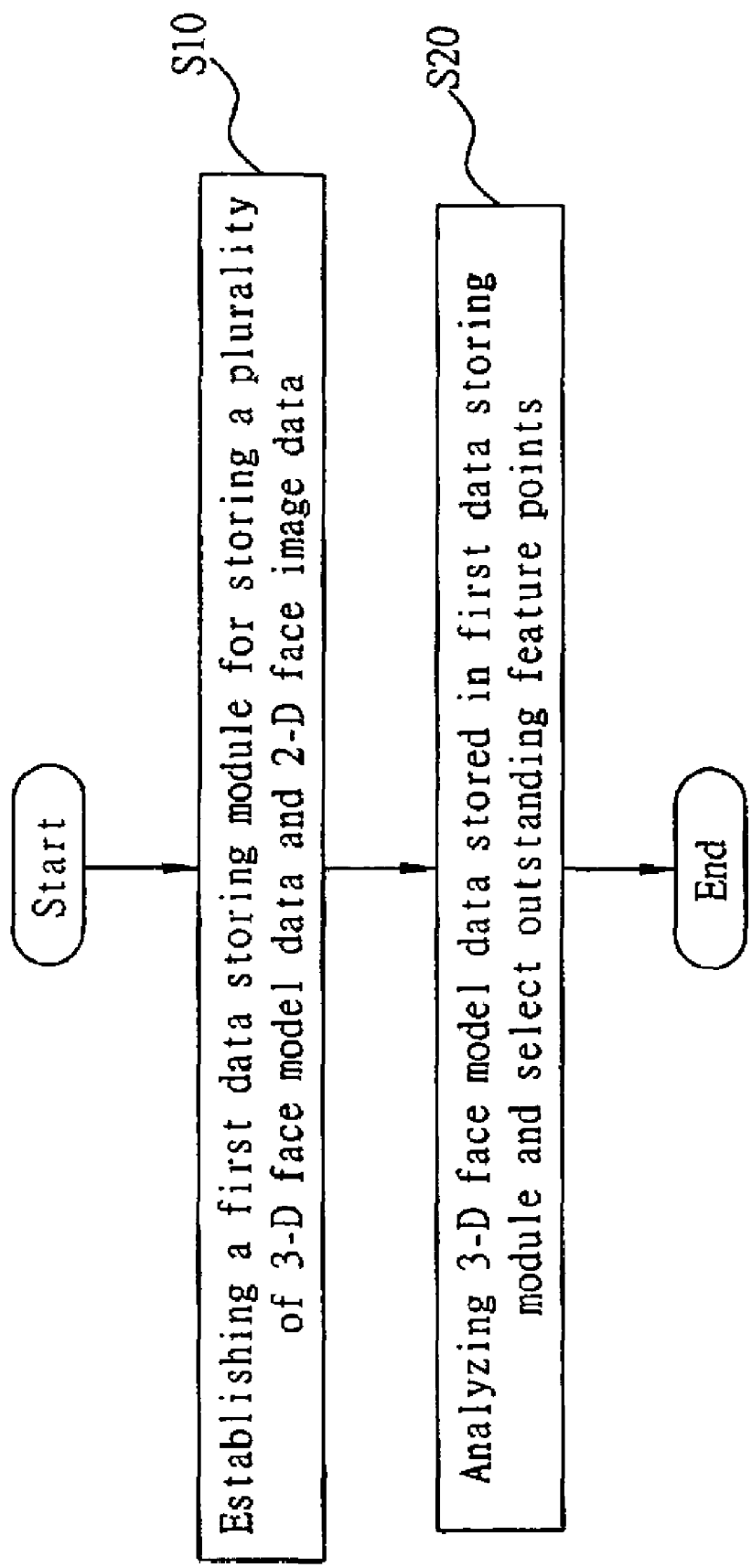
FIG. 2 shows a flowchart of the registration process of the 3-D face recognition method of the present invention.

FIG. 2 shows a flowchart of the registration process of the 3-D face recognition method of the present invention. As shown, the registration process includes the following steps. First, in step S10, a first data storing module 10 is established in advance for storing a plurality of 3-D face model data and 2-D facial image data. Then, step S20 is executed.

In step S20, the geometric characteristics of each point in the point group in each region of the 3-D face model data are analyzed to determine the various feature points in the 3-D face model data, and the 2-D facial image data are used to assist in confirming the various feature points of the 3-D face model data in order to select the most outstanding feature points in each region. Different feature points are given different weight ratios. A symmetric face is defined and given respective weight ratios. This completes the registration process.

Figure 3:
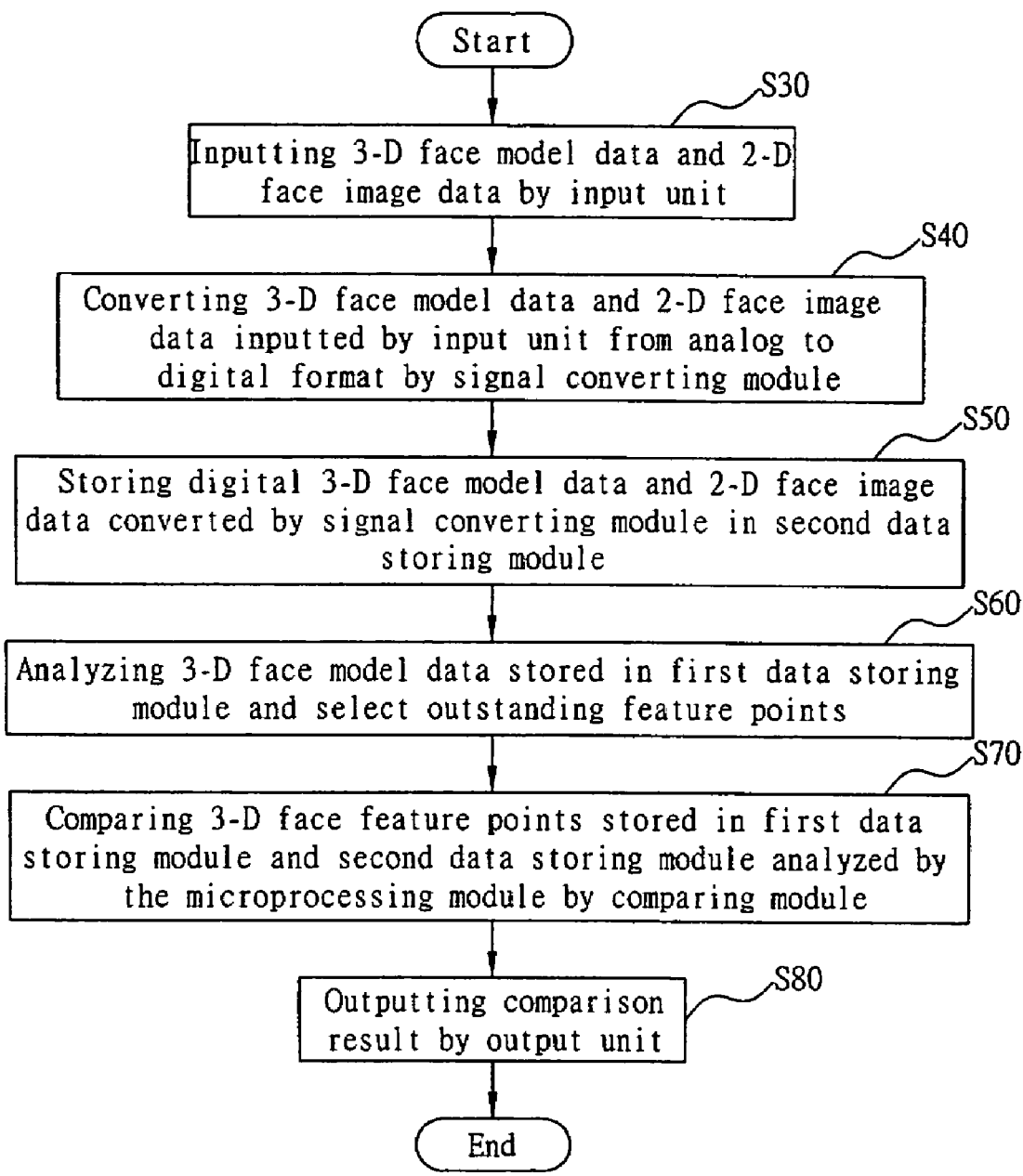
FIG. 3 shows the verification process of the 3-D face recognition method of the present invention.

FIG. 3 shows the verification process of the 3-D face recognition method of the present invention. As shown, the verification process includes the following steps. In step S30, 3-D face model data and 2-D facial image data are inputted by an input unit 30. Then, step S40 is performed.

In step S40, the 3-D face model data and 2-D facial image data inputted by the input unit 30 are converted from analog to digital format by a signal converting module 40. Then, step S50 is performed.

In step S50, the converted digital 3-D face model data and 2-D facial image data are stored in a second data storing module 50. Then step S60 is performed.

In step S60, the geometric characteristics of each point in the point group in each region of the 3-D face model data stored in the second data storing module are analyzed by a microprocessing module 20 to determine the various feature points in the 3-D face model data, and the 2-D facial image data are used to assist in confirming the various feature points of the 3-D face model data in order to select the most outstanding feature points in each region. Different feature points are given different weight ratios. Thereafter, step S70 is performed.

In step S70, the 3-D face feature points stored in the first data storing module 10 and the second data storing module 50 analyzed by the microprocessing module 20 are compared with each other by a comparison module 60, and a symmetric face is defined such that different weight ratios are given. During comparison, the relativity between the two sets of data are determined according to the different weight ratios given to the geometric characteristics of the feature points in the two modules, thereby obtaining a comparison result. Then, step S80 is performed.

In step S80, the comparison result determined by the comparison module 60 is outputted by an output unit 70. This completes the verification process of the 3-D face recognition method of the present invention.

FIG. 4 shows the experimental data for the 3-D face recognition system of the present invention. In the experiment, a number of faces are cross-compared, and the result achieves recognition rate of nearly a hundred percent.

It can be understood from the above that the 3-D face recognition system of the present invention essentially analyzes various feature points in the 3-D face model data and uses the 2-D facial image data to assist in selecting the appropriate feature points, in which the feature points that are less likely to change are assigned with more weight. In addition, a symmetric face is defined and weight ratios are assigned according to the distance from the symmetric face. The further a feature point is from the symmetric face, the less weight ratio is assigned thereto. During comparison, the difference in geometric characteristics between the feature points of the 3-D face model data to be recognized and the pre-stored 3-D face model are determined and since that different weight ratio are taken into consideration, the recognition rate (i.e. accuracy of recognition) can be improved.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A three-dimensional (3-D) face recognition system, comprising:
   a first data storing module for storing a plurality of 3-D face model data and two-dimensional (2-D) face image data;
   an input unit for inputting 3-D face model data and 2-D face image data;
   a signal converting module for converting analog data of the 3-D face model data and 2-D face image data inputted by the input unit to digital data;
   a second data storing module for storing the digital data of the 3-D face model data and 2-D face image data after converted by the signal converting module;
   a microprocessing module for analyzing geometric characteristics of various points in the 3-D face model data stored in the first data storing module and the second data storing module so as to determine feature points of the 3-D face model data and store the feature points in the respective first and second data storing module, wherein the 2-D facial image data is used to assist in confirming the various feature points of the 3-D face model data in order to select the most outstanding feature points in each region, and different weight ratios being given to different feature points;
   a comparing module for comparing the feature points stored in the first data storing module and the second data storing module analyzed by the microprocessing module, during which, different geometric characteristics being given different weight ratios, and calculating relativity between the two sets of feature points to obtain a comparison result; and
   an output unit for outputting the comparison result compared by the comparing module.

2. The 3-D face recognition system of claim 1, wherein the system is applicable to an intelligent information platform.

3. The 3-D face recognition system of claim 2, wherein the intelligent information platform is one of a desktop computer, a notebook computer, a Personal Digital Assistant (PDA).

4. The 3-D face recognition system of claim 1, wherein the microprocessing module further defines a symmetric face, such that different weight ratios are given to the feature points based on their distances from the symmetric face.

5. The 3-D face recognition system of claim 1, wherein the geometric characteristics analyzed by the microprocessing module are at least one of a relative location of a point in the 3-D region, the curvature, changes in the curvature and the normal vector of the point.

6. The 3-D face recognition system of claim 1, wherein the feature points are selected such that they are not easily changed by human facial expression and are at proximity of bones.

7. The 3-D face recognition system of claim 1, wherein the feature points include at least one of a nose tip, an inner eye corner, an outer eye corner and a mouth corner.

8. The 3-D face recognition system of claim 1, wherein a point within a region is selected as a substantial feature point if a curvature value of the point is a principal curvature of curvature values of points within the region, and the principal curvature is between −0.03 and 0.01, and a variance of the principal curvature is smaller than 0.02.

9. The 3-D face recognition system of claim 1, wherein the geometric characteristics are assigned with different weight ratios based on how easily they are affected by facial expression.

10. The 3-D face recognition system of claim 1, wherein the input unit is a scanner.

11. The 3-D face recognition system of claim 1, wherein the geometric characteristics compared by the comparing module include at least one of a distance between the eyes, a distance of the nose bridge and a distance between the upper lip and the nose tip.

12. A 3-D face recognition method, comprising:
establishing a first data storing module for storing a plurality of 3-D face model data and 2-D face image data;
inputting 3-D face model data and 2-D face image data by an input unit;
converting analog data of the 3-D face model data and 2-D face image data inputted by the input unit to digital data by a signal converting module;
storing the digital data of the 3-D face model data and 2-D face image data converted by the signal converting module in a second data storing module;
analyzing geometric characteristics of various points in the 3-D face model data stored in the first data storing module and the second data storing module by a microprocessing module, so as to determine feature points of the 3-D face model data and store the feature points in the respective first and second data storing module, wherein the 2-D facial image data is used to assist in confirming the various feature points of the 3-D face model data in order to select most outstanding feature points in each region, and different weight ratios being given to different feature points;
comparing the 3-D face feature points stored in the first data storing module and the second data storing module analyzed by the microprocessing module by a comparing module, during which, different geometric characteristics being given different weight ratios, and calculating relativity between the two sets of 3-D face feature points to obtain a comparison result; and
outputting the comparison result compared by the comparing module by an output unit.

13. The 3-D face recognition method of claim 12, wherein the method is applicable to an intelligent information platform.

14. The 3-D face recognition method of claim 13, wherein the intelligent information platform is one of a desktop computer, a notebook computer, a Personal Digital Assistant (PDA).

15. The 3-D face recognition method of claim 12 comprising a registration process and a verification process.

16. The 3-D face recognition method of claim 12, wherein a symmetric face is further defined by the microprocessing module, such that different weight ratios are given to the feature points based on their distances from the symmetric face.

17. The 3-D face recognition method of claim 12, wherein the geometric characteristics analyzed by the microprocessing module are at least one of a relative location of a point in the 3-D region, the curvature, changes in the curvature and the normal vector of the point.

18. The 3-D face recognition method of claim 12, wherein the feature points are selected such that they are not easily changed by human facial expression and are at proximity of bones.

19. The 3-D face recognition method of claim 12, wherein the feature points include at least one of a nose tip, an inner eye corner, an outer eye corner and a mouth corner.

20. The 3-D face recognition method of claim 12, wherein a point within a region is selected as a substantial feature point if a curvature value of the point is a principal curvature of curvature values of points within the region, and the principal curvature is between −0.03 and 0.01, and a variance of the principal curvature is smaller than 0.02.

21. The 3-D face recognition system of claim 12, wherein the geometric characteristics are assigned with different weight ratios based on how easily they are affected by facial expression.

22. The 3-D face recognition method of claim 12, wherein the input unit is a scanner.

23. The 3-D face recognition method of claim 12, wherein the geometric characteristics compared by the comparing module include at least one of a distance between the eyes, a distance of the nose bridge and a distance between the upper lip and the nose tip.

* * * * *